United States Patent [19]

Yoshida

[11] 4,366,716

[45] Jan. 4, 1983

[54] PRESSURE TRANSDUCER

[75] Inventor: Takeshi Yoshida, Tokyo, Japan

[73] Assignee: Hokushin Electric Works, Ltd., Tokyo, Japan

[21] Appl. No.: 242,739

[22] Filed: Mar. 11, 1981

[30] Foreign Application Priority Data

Mar. 17, 1980 [JP] Japan .................................. 55-33567

[51] Int. Cl.³ .............................................. G01L 9/12
[52] U.S. Cl. ...................................... 73/718; 361/283
[58] Field of Search .................... 73/718, 724; 361/283

[56] References Cited

U.S. PATENT DOCUMENTS

| 3,413,857 | 12/1968 | Ellis | 73/718 |
|---|---|---|---|
| 3,783,693 | 1/1974 | Paros | 73/718 |
| 3,878,725 | 4/1975 | Gaertner | 73/718 |
| 4,311,053 | 1/1982 | Cucci | 73/718 |

Primary Examiner—Donald O. Woodiel

Attorney, Agent, or Firm—Sughrue, Mion, Zinn, Macpeak & Seas

[57] ABSTRACT

A pressure transducer which produces an output capacitance signal which is unaffected by temperature or mechanical distortion. A sensing chamber is provided at the center of a pressure sensor body with the sensing chamber being filled with a sealed liquid. A moving electrode of a cantilever structure is disposed in the sensing chamber and a through hole extends from the sensing chamber to at least one side of the pressure sensor body. A pressure receiving element is disposed on at least one side of the pressure sensor body and a rod couples the pressure receiving element and the moving electrode through the through hole. Two fixed electrodes of a cantilever structure are disposed opposite the moving electrode to form first and second variable capacitance elements together with the moving electrode.

8 Claims, 10 Drawing Figures

PRESSURE TRANSDUCER

BACKGROUND OF THE INVENTION

The present invention relates to a pressure transducer for obtaining an electric signal corresponding to a pressure through the use of variable capacitance elements whose impedances vary with a displacement corresponding to the pressure.

A known capacitance type differential pressure transmitter is, for example, disclosed in Japanese Published Patent No. 23916/74. In a pressure sensor described therein, a cell is divided into two metal parts, a metallic film is formed on each metal part through an insulator and a sensing diaphragm forming a condenser plate is held by the two metal parts together with the metallic films. By pressures applied to pressure receiving diaphragms provided on both sides of the pressure sensor body, the sensing diaphragm is displaced to cause changes in the capacitances of first and second variable capacitance elements formed between the sensing diaphragm and the metallic films. From these capacitance variations are obtained an electric signal corresponding to the pressure.

A prior art example of a converter circuit for use with such a pressure is, for instance, described in Japanese Published Utility Model No. 21643/72. The converter circuit proposed therein employs an oscillator for generating an AC signal whose amplitude is controlled by a control unit and the AC signal is applied to the first and second variable capacitance elements of such a pressure sensor. An output voltage proportional to a difference between currents flowing through the variable capacitance elements is obtained by two rectifier elements connected to respective ones of the variable capacitance elements with reverse polarities and a smoothing circuit. At the same time, a voltage proportional to the sum of the currents is obtained and compared with a reference voltage. The resultant difference voltage is fed back to the control unit. By properly selecting the values of circuit elements, there is obtained a signal corresponding to the ratio between the difference and sum of the first and second variable capacitance elements.

The above-mentioned conventional capacitance type pressure sensor employs a flat diaphragm as the sensing diaphragm and holds it with the two metal parts therebetween. However, the pressure sensor is liable to be thermally distorted due to a difference between the expansion coefficients of the sensor body and the sensing diaphragm. Additionally, it is subjected to a mechanical distortion when the entire pressure sensor is clamped by fitting flanges. Moreover, the sensor body is composed of two separate metal parts which must be welded together with the sensing diaphragm held therebetween which makes the manufacturing cost high.

The prior art conventional converter circuit has the defect that its output varies with ambient temperature variations. That is, the rectifier elements used in the converter circuit may have different temperature characteristics and the output signal is affected by such characteristic differences of the rectifier elements. Further, in the above conventional converter circuit, currents flowing in the variable capacitance elements must be controlled to be a constant value which makes the circuit arrangement complex.

Accordingly, it is an object of the present invention to provide a pressure transducer which has a pressure sensor free from the above-mentioned defects of the prior art, simple in structure and which is not susceptible to influences of thermal and mechanical distortions.

Another object of the present invention is to provide a pressure transducer which has a converter circuit capable of stably amplifying an electric signal detected by the pressure sensor and transmitting the amplified signal to a receiving instrument.

Yet another object of the present invention is to provide a pressure transducer which has a pressure sensor in which variable capacitance elements are simply mounted and their electrodes are led out of the sensor body while being electrically insulated therefrom.

SUMMARY OF THE INVENTION

A first structural feature of the present invention resides in the use of a capacitance type pressure sensor in which a first cantilever forming a condenser plate is disposed in a sensing room of the sensor body, a through hole is formed in the sensor body which extends from the sensing chamber to both or one side of the body, a pressure receiving diaphragm mounted on either or one side surface of the sensor body is coupled to the cantilever by means of a rod, and second and third fixed condenser plates of the cantilever construction are disposed on both sides of the first cantilever.

A second structural feature of the present invention resides in the combined use of the above capacitance type pressure sensor and a converter circuit in which first and second variable capacitance elements formed by the above said condenser plates are alternately connected via a change-over switch to an oscillator circuit to generate timing varying signals corresponding to the impedances of the first and second variable capacitance elements and a signal corresponding to the ratio between the difference and sum of the frequency signals is derived therefrom.

A third structural feature of the present invention lies in that the first, second and third cantilevers such as mentioned above are fixed by packing glass in a sealing cap for sealing a sealed liquid in the sensing chamber of the sensor body so that they are electrically insulated from another.

BRIEF DESCRIPTION OF THE DRAWINGS

FIGS. 3(a) and (b) are front views of a moving electrode and a fixed electrode as viewed from the sides of the pressure receiving diaphragms;

DESCRIPTION OF THE PREFERRED EMBODIMENTS

Figure 1:
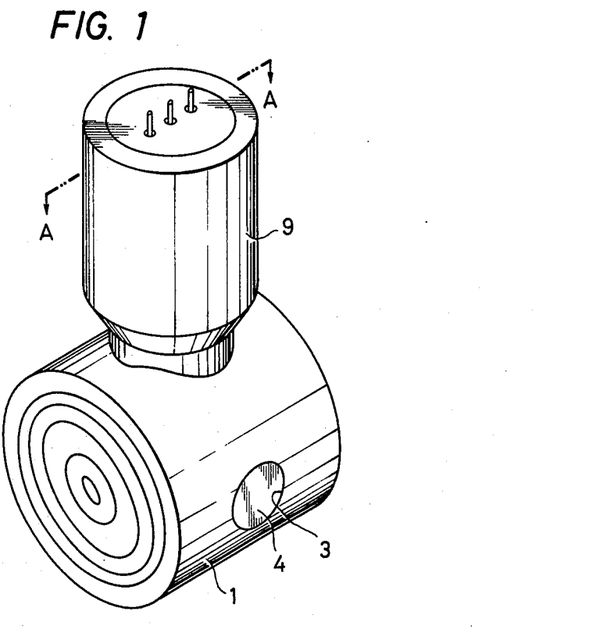
FIG. 1 is a perspective view showing a capacitance type pressure sensor of the present invention.

With reference to the accompanying drawings, the present invention will hereinafter be described in detail. FIG. 1 is a perspective view showing a capacitance type pressure sensor for use in the pressure transducer of the present invention, and FIG. 2 is a sectional view taken along the line A—A in FIG. 1.

Figure 2:
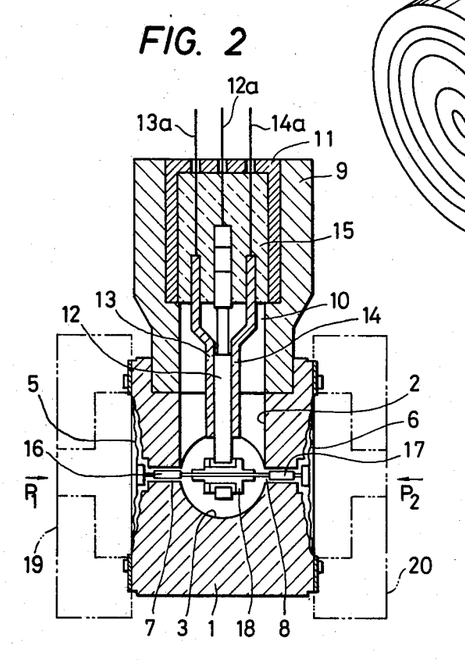
FIG. 2 is a sectional view taken on the line A—A in FIG. 1.

In FIGS. 1 and 2, reference numeral 1 indicates a cylindrical body made of a metal. The body 1 has formed therein a hole 2 which extends from the peripheral surface of the body 1 to the center thereof to form a sensing chamber and a hole 3 which extends across the hole 2 at right angles thereto for mounting components in the body 1. The hole 3 is sealed at by a plug 4 of the same metal as the body 1 after assembling. On both side surfaces of the body 1 there are formed corrugations of the same configuration as those of pressure receiving diaphragms 5 and 6 which are mounted on the side surfaces. Holes 7 and 8 are formed in the body 1 extending from the centers of the corrugations to the sensing chamber.

Reference numeral 9 designates a cylindrical metal housing in which are mounted measuring elements such as condenser plates or the like. The housing 9 has formed therein a through hole 10 which communicates with the sensing chamber 2 provided in the body 1. A tube 11 is fitted as a flank cap into the upper opening of the through hole 10. The tube 11 has incorporated therein a condenser plate 12 as a moving electrode and a pair of opposing condenser plates 13 and 14 as fixed electrodes which are disposed on both sides of the condenser plate 12 at equal distances. These condenser plates are fixed by the filling of glass 15 while being insulated from one another. The electrodes may be made of a metal or made by evaporating a metal on the surface of glass, ceramic material or the like.

Figures 3A, 3B:
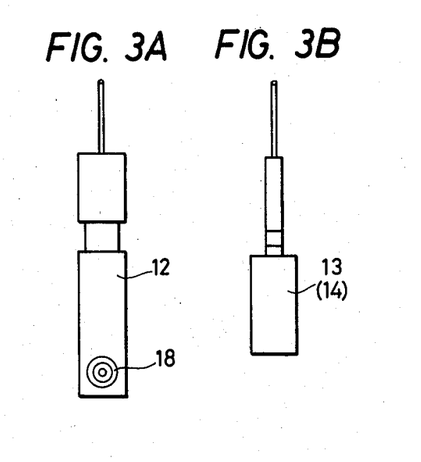

The relationship between the moving electrode 12 and the fixed electrodes 13 and 14 will now be described in greater detail. FIGS. 3(a) and 3(b) are front views of the moving electrode 12 and the fixed electrodes 13 and 14 as viewed from the sides of the pressure receiving diaphragms 5 and 6, respectively. For example, as shown somewhat exaggeratingly in an enlarged diagram of FIG. 4, the fixed electrode 13 (or 14) is disposed relative to the moving electrode 12 so that the space therebetween increases towards the lower end of the former so that the ratio of the initial space between them to the displacement of the moving electrode 12 is always constant over the entire length of the fixed electrode 13 (or 14). This ensures that the displacement of the moving electrode 12 by a differential pressure and the resulting output bear a linear relationship. To the base portions of the moving electrode 12 and the fixed electrodes 13 and 14 are respectively connected leads 12a, 13a and 14a which are insulated from the sensor body 1 and are led out thereof.

The moving electrode 12 is coupled to the pressure receiving diaphragms 5 and 6 through rods 16 and 17, respectively, as follows. The rods 16 and 17 are respectively welded in advance to the centers of the pressure receiving diaphragms 5 and 6 and they are inserted into the sensor chamber 2 from the holes 7 and 8 when the pressure receiving diaphragms 5 and 6 are mounted on the body 1. The tip of the moving electrode 12 has attached thereto through an insulator a metal boss 18 for attaching the rods 16 and 17. The free ends of the rods 16 and 17 are guided into the boss 18, using the hole 3 formed in the body 1, and welded to the boss 18 by a welder inserted into the hole 3. Thereafter, the plug 4 is pressed into the hole 3 to seal it.

The sensing chamber 2, the hole 10 and other spaces are filled with an incompressible liquid and fitting flanges 19 and 20 are attached to both sides of the body 1, as indicated by one-dot chain lines.

Next, a description will be given of the operation of the capacitance type pressure sensor of the present invention which has such an arrangement as described above. When pressures $P_1$ and $P_2$ have been applied to the pressure receiving diaphragms 5 and 6 to displace the moving electrode 12 by a differential pressure, the distances between the moving electrode 12 and the fixed electrodes 13 and 14 are changed and hence the capacitances $C_1$ and $C_2$ therebetween vary differentially.

In general, a converter circuit at the latter stage of the pressure sensor produces, as an output corresponding to the differential pressure, an electric signal which is proportional to $$\frac{C_1 - C_2}{C_1 + C_2}.$$

In order to obtain an output having a linear relationship to the differential pressure, however, it is necessary to arrange the electrodes so that the capacitances $C_1$ and $C_2$ between the moving electrode 12 and the fixed electrodes 13 and 14 may bear such relationships as described hereinbelow.

Figure 4:
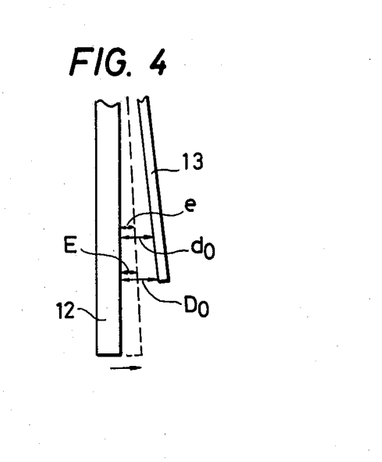
FIG. 4 is a partial enlarged view showing the relationship between the moving electrode and each fixed electrode.

$D_0$ is here used to represent the distance between the moving electrode 12 and the fixed electrode 13 at the tip of the latter in the case of no pressures being applied, $E$ a displacement of the moving electrode at the position of the tip of the electrode 13, $d_0$ the space between the electrodes 12 and 13 at a given position in the case of no pressures being applied, and $e$ a displacement of the moving electrode at the given position, as shown in FIG. 4. By arranging the fixed electrode 13 relative to the moving electrode 12 in such a manner that the ratio of the space between them to the displacement of the moving electrode 12 in the case of no pressures being applied is always be constant at any position over the entire length of the fixed electrode 13, the following relationship is established:

$$\frac{e(S)}{d_0(S)} = \frac{E}{D_0}. \tag{1}$$

The capacitance $C_1$ between the moving electrode 12 and the fixed electrode 13 can be obtained by the following expression:

$$C_1 = \int_S \frac{\epsilon_0 \cdot \epsilon}{d_0 - e} \, ds, \tag{2}$$

where $S$ is the electrode area, $\epsilon_0$ is the dielectric constant in a vacuum and $\epsilon$ is the specific inductive capacity of the sealed liquid. The expression (2) can be rewritten using the expression (1) as follows:

$$C_1 = \int_S \frac{\epsilon_0 \cdot \epsilon}{d_0 - \frac{d_0}{D_0} \cdot E} \, ds = \frac{\epsilon_0 \cdot \epsilon \cdot D_0}{D_0 - E} \int_S \frac{1}{d_0} \, ds = \tag{3}$$

-continued $$\frac{K}{D_0 - E},$$

where K is a constant.

Likewise, the capacitance $C_2$ between the moving electrode 12 and the fixed electrode 14 can be obtained by the following expression:

$$C_2 = \frac{\epsilon_0 \cdot \epsilon \cdot D_0}{D_0 + E} \int_S \frac{1}{d_0} ds = \frac{K}{D_0 + E}. \quad (4)$$

Substituting the expressions (3) and (4) into the expression $$\frac{C_1 - C_2}{C_1 + C_2},$$

it follows that:

$$\frac{C_1 - C_2}{C_1 + C_2} = \frac{\frac{K}{D_0 - E} - \frac{K}{D_0 + E}}{\frac{K}{D_0 - E} + \frac{K}{D_0 + E}} = \frac{E}{D_0}. \quad (5)$$

Since $D_0$ is a constant and since E is a value proportional to a differential pressure, the output is in proportion to the differential pressure. Accordingly, it is not necessary in this case to compensate for the linearity of the output by an electric circuit.

In order to miniaturize such a differential pressure type pressure sensor, slight differences in the effective area and spring constant between the diaphragms 5 and 6 bring about nonnegligible output variations. That is, the internal pressure is varied by a change in the volume of the sealed liquid due to a temperature change, by which the moving electrode 12 coupled to the diaphragms 5 and 6 through the rods 16 and 17 is displaced in one direction resulting in an output variation.

Figures 5, 6:
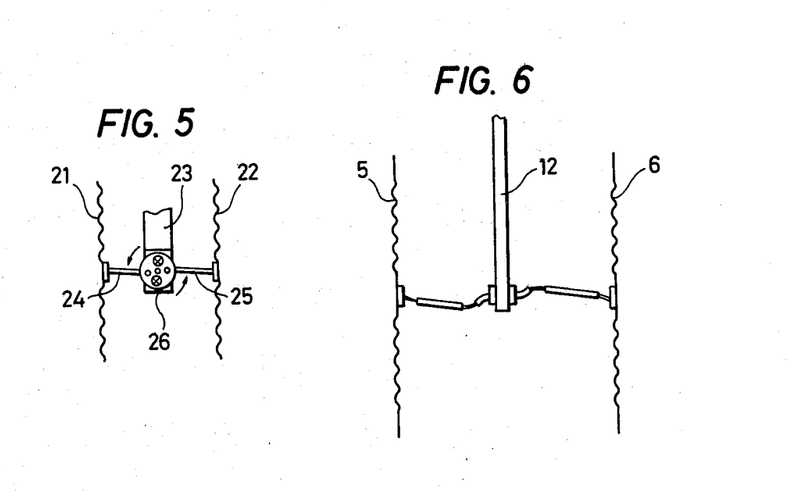
FIGS. 5 and 6 are schematic diagrams showing a specific example of a technique of compensating for output variations due to a difference in the effective area between the pressure receiving diaphragms.

One technique for compensating for the output variations due to the differences in the effective area, and other such factors, between the pressure receiving diaphragms is to reduce the thicknesses of the diaphragms. However, this limits the applications of the device. A known technique which is free from such a defect is, for instance, as shown in FIG. 5, to compensate a difference between forces applied to both diaphragms 21 and 22 by shifting the point of application of a force on a bar 23. With this technique, a clamp 26 for attaching rods 24 and 25 of the diaphragms 21 and 22 to the bar is provided thereon in such a manner as to be rotatable in the direction of the arrows. The point of application is regulated by turning the clamp 26 little by little.

In the capacitance type pressure sensor of the present invention, the diaphragms 5 and 6 and the moving electrode 12 are interconnected by the rods 16 and 17 and, in this case, the above described compensation can also be achieved by providing such a rotatable clamp 26 as shown in FIG. 5. Nevertheless, the same results as obtainable with the arrangement of FIG. 5 can be produced more easily bending the rods 16 and 17 as schematically shown in FIG. 6.

Next, a description will be given, with reference to FIG. 7, of a converter circuit which is suitable for use with the pressure sensor of the present invention. A one-dot chain line block 27 corresponds to the capacitance type pressure sensor depicted in FIGS. 1 and 2.

Reference numeral 27a indicates a first variable capacitance element formed by the fixed electrode 13 and the moving electrode 12 and 27b designates a second variable capacitance element formed by the fixed electrode 14 and the moving electrode 12. A one-dot chain block 28 is a change-over switch composed of a pair of switching devices 28a and 28b which are opened and closed alternately with each other in a complementary manner. Reference numeral 29 identifies a variable frequency type oscillator which is connected via the change-over switch 28 to the variable resistance elements 27a and 27b alternately to generate first and second frequency signals $f_1$ and $f_2$ corresponding to impedance variations of the variable capacitance elements 27a and 27b in relation to the switching operation of the change-over switch 28. Reference numeral 30 denotes an arithmetic unit which counts a certain number of pulses or cycles each of the first and second frequency signals $f_1$ and $f_2$ from the variable frequency type oscillator 29 and produces in response thereto a signal representing the ratio between the difference and sum of these frequency signals. Reference numeral 31 represents an output unit for outputting the signal from the arithmetic unit 30 after amplifying it.

With such an arrangement, the first and second variable capacitance elements 27a and 27b are alternately connected via the switching devices 28a and 28b to the variable frequency type oscillator 29 in accordance with the operational periods of the switching devices 28a and 28b. The periods of closure of the switching devices 28a and 28b are hereinafter referred to as first and second periods, respectively. In the first period the variable frequency type oscillator 29 produces the first frequency signal $f_1$ corresponding to the capacitance $C_1$ of the first variable capacitance element 27a, whereas in the second period the oscillator 29 produces the second frequency signal $f_2$ corresponding to the capacitance $C_1$ of the second variable capacitance element 27b. If an oscillator is used as the variable frequency type oscillator 29 which generates signals of frequencies inversely proportional to the capacitances $C_1$ and $C_2$ of the first and second variable capacitance elements 27a and 27b, the frequencies $f_1$ and $f_2$ of the first and second frequency signals are given by $f_1 = k/C_1$ and $f_2 = k/C_2$, respectively. The arithmetic unit 30 supplies the output unit 31 with duty cycle signals related to the frequencies $f_1$ and $f_2$ in the first and second periods respectively. The output unit 31 receives the signals from the arithmetic unit 30 to provide an analog signal D of a value proportional to $$D = \frac{f_1 - f_2}{f_1 + f_2}.$$

Figure 7:
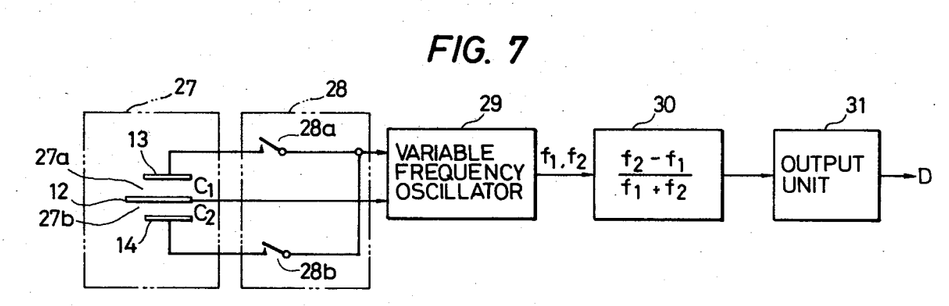
FIG. 7 is a block diagram illustrating a converter circuit suitable for use with the capacitance type pressure sensor of the present invention.
Figure 8:
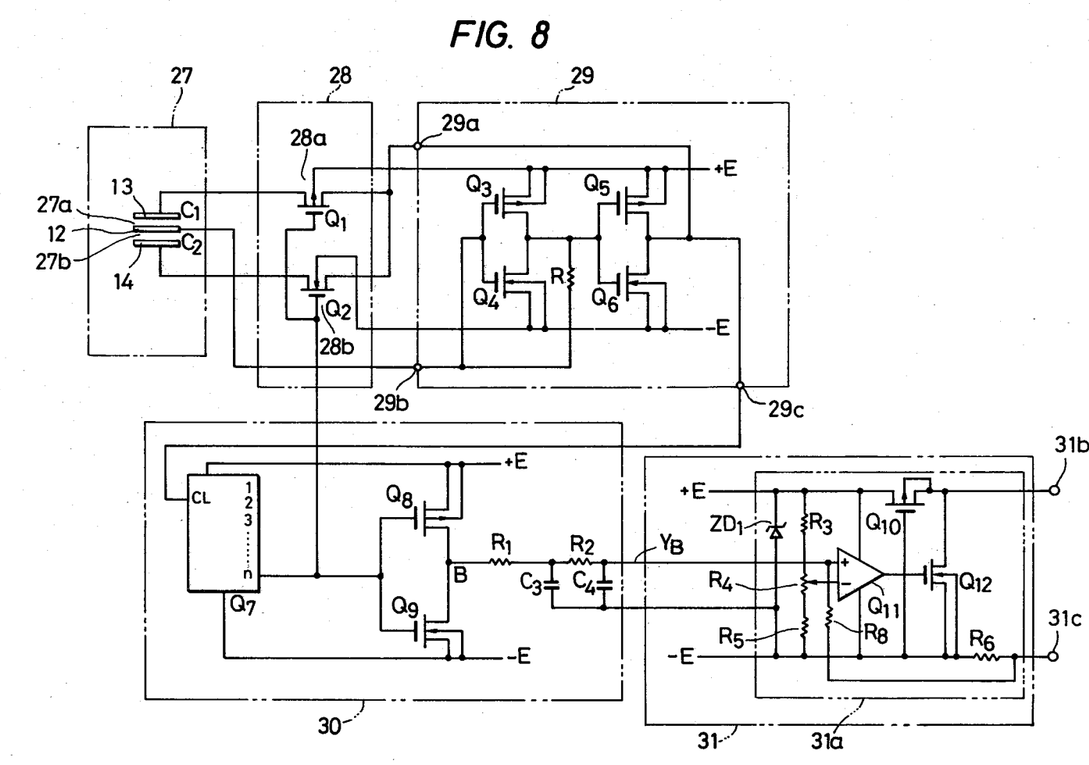
FIG. 8 is a circuit diagram illustrating a specific example of the converter circuit.

FIG. 8 illustrates a specific circuit arrangement of the converter circuit of the present invention depicted schematically in FIG. 7. In FIG. 8, elements corresponding to those in FIG. 7 are marked with the same reference numerals and no further description of them will be given. Reference characters $Q_1$ and $Q_2$ indicate complementary MOSFET switches. The fixed electrodes 13 and 14 are connected to one input end 29a of the variable frequency type oscillator 29 via the switches $Q_1$ and $Q_2$, respectively, and the moving electrode 12 is connected to the other input end 29b of the oscillator 29.

The variable frequency type oscillator 29 formed, for example, by an RC oscillator which includes a complementary MOSFET inverting amplifier composed of FETs $Q_3$ and $Q_4$ and a complementary MOSFET inverting amplifier composed of FETs $Q_5$ and $Q_6$. In the example of FIG. 8 the input end 29a is connected to a source and a drain of the FETs $Q_5$ and $Q_6$, whereas the input end 29b is connected to first gates of the FETs $Q_3$ and $Q_4$ and connected via a resistor R to a source and a drain of the FETs $Q_3$ and $Q_4$ and first gates of the FETs $Q_5$ and $Q_6$. The sources and second gates of the FETs $Q_3$ and $Q_5$ are connected to a positive power source $+E$ and the drains and second gates of the FETs $Q_4$ and $Q_6$ are connected to a negative power source $-E$. The connection point between the FETs $Q_5$ and $Q_6$ is connected to an output terminal 29c from which the first and second frequency signals are provided to the arithmetic unit 30 in synchronization with the opening and closing of the switches $Q_1$ and $Q_2$. The oscillation frequency of the variable frequency type oscillator 29 depends on the values of the electrostatic capacitances $C_1$ and $C_2$ of the first and variable capacitance elements 27a and 27b connected between the input ends 29a and 29b. The oscillator 29 produces the first and second frequency signals in correspondence with reciprocals of time constants which are determined by the electrostatic capacitances $C_1$ and $C_2$ and the resistance value of the resistor R.

The arithmetic unit 30 includes an n-bit (n being a positive integer) counter $Q_7$ and complementary MOSFET switching gates $Q_8$ and $Q_9$. The first and second frequency signals are supplied to the counter $Q_7$. The most significant bit output of the counter $Q_7$ is provided to the gate of each of the FET switches $Q_1$ and $Q_2$ of the change-over switch 28 and supplied to a first gate of each of the complementary MOSFETs switches $Q_8$ and $Q_9$. A source and a second gate of the switch $Q_8$ are connected to the positive power source $+E$ and a drain and a second gate of the switch $Q_9$ are connected to the negative power source $-E$. The drains and sources of the switches $Q_8$ and $Q_9$ are respectively interconnected and the connection point is connected to a smoothing circuit which is composed of resistors $R_1$ and $R_2$ and capacitors $C_3$ and $C_4$.

With such an arrangement, when the output from the counter $Q_7$ of the arithmetic unit 30 is at the zero level, the switch $Q_8$ and the switch $Q_1$ of the change-over switch 28 remain in the ON state. In this state, the first frequency signal of frequency $f_1$, which is related to the reciprocal of the time constant determined by the capacitance $C_1$ of the sensor 27 and the resistor R of the oscillator 29, is applied to a clock gate CL of the counter $Q_7$. Next, when the counting by the counter $Q_7$ has proceeded so as the change the output to a "1" level, the switch $Q_8$ is turned OFF, the switch $Q_9$ is turned ON and the switches $Q_1$ and $Q_2$ of the change-over switch 28 are set to the OFF and the ON states, respectively. In this state, the second frequency signal of the frequency $f_2$, which is determined in accordance with the reciprocal of the time constant of the capacitance $C_2$ of the sensor 27 and the resistor R of the oscillator 29, is provided to the clock gate CL of the counter $Q_7$. When the counting by the counter $Q_7$ has further proceeded to return its output to the zero level, the counting of the first frequency signal is resumed. In this way, the first and second frequencies are counted by the counter $Q_7$ alternately with each other.

Figure 9:
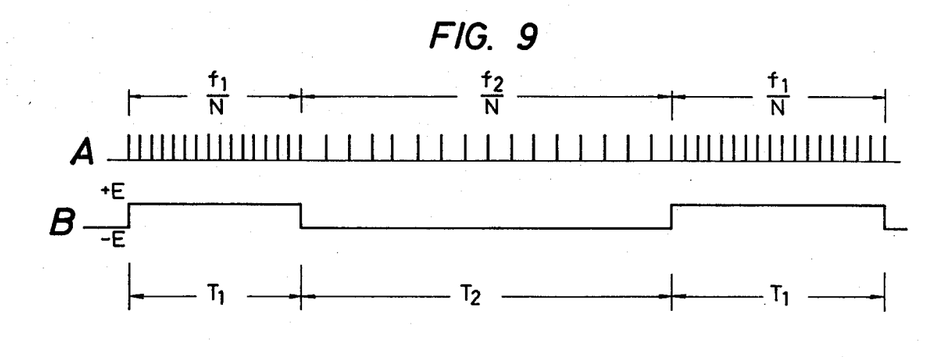
FIG. 9 is an explanatory timing diagram of the operation of the converter circuit shown in FIG. 8.

FIG. 9 is an explanatory timing diagram corresponding to the operation of the converter circuit depicted in FIG. 8. In FIG. 9, A shows the frequency signals which are provided from the output end 29c of the variable frequency type oscillator 29 and B the output waveforms which are outputted via the switches $Q_8$ and $Q_9$ of the arithmetic unit 30. That is, the counter $Q_7$ counts the first and second frequency signals $f_1$ and $f_2$ by steps of N (which is the full count number of the counter $Q_7$) and then changes the state of the most significant bit. Accordingly, a time $T_1$ during which the first frequency signal is generated is given by $T_1 = N/f_1$ and a time $T_2$ during which the second frequency signal is generated is given by $T_2 = N/f_2$. Accordingly, the first and second frequency signals are alternately obtained from the variable frequency type oscillator 29, as indicated by A in FIG. 9.

In the arithmetic unit 30, the switches $Q_8$ and $Q_9$ are turned ON for each period of time $T_1$ and $T_2$, respectively, providing a duty cycle signal which alternately assumes the voltages $+E$ and $-E$ for the periods of time $T_1$ and $T_2$ as shown in by B in FIG. 9. This output signal is smoothed by the smoothing circuit composed of the resistors $R_1$ and $R_2$ and the capacitors $C_3$ and $C_4$, thus providing from the arithmetic unit 30 the signal proportional to $$D = \frac{f_1 - f_2}{f_1 + f_2}.$$

Namely, since a smoothed potential $V_B$ of the smoothing circuit is a mean value of the output waveform B in FIG. 9, it follows that:

$$V_B = \frac{T_1 \times (+E) + T_2 \times (-E)}{T_1 + T_2} = \frac{T_1 - T_2}{T_1 + T_2} E.$$

With the relationships $T_1 = N/f_1$ and $T_2 = N/f_2$, the following voltage can be obtained:

$$V_B = \frac{\frac{N}{f_1} - \frac{N}{f_2}}{\frac{N}{f_1} + \frac{N}{f_2}} = \frac{f_2 - f_1}{f_1 + f_2} \times E.$$

This voltage is applied to a two-wire transmitter, indicated by a one-dot chain line block 31a in the output unit 31, which transmitter outputs a current signal. This arrangement is known per se, in which output ends 31b and 31c are used as power source terminals and signal output terminals in common. Reference character $Q_{10}$ indicates a FET forming a constant-current device and $ZD_1$ designates a diode for producing the constant voltages $+E$ and $-E$ for the output unit 31, the change-over switch 28, the variable frequency type oscillator 29 and the arithmetic unit 30. To a non-inverting terminal of an operational amplifier $Q_{11}$ is applied the aforementioned smoothed voltage $V_B$ and to an inverting terminal is applied a voltage obtained by dividing the constant voltages $+E$ and $-E$ by resistors $R_3$, $R_4$ and $R_5$. The output from the operational amplifier $Q_{11}$ is provided as a driving signal to an output transistor $Q_{12}$ to control the output current across the output terminals 31b and 31c. A resistor $R_6$ acts as a feedback resistor which is connected between the output transistor $Q_{12}$ and the output terminal 31c. The feedback voltage produced by the feedback resistor $R_6$ is negatively fed back in such a manner as to be subtracted from the smoothed voltage $V_B$ thus controlling the output current. In this way, a current signal of a value proportional to the smoothed voltage $V_B$ is provided across output terminals 31b and 31c.

As has been described above, in the capacitance type pressure sensor of the present invention, since the two fixed electrodes and the moving electrode disposed therebetween are of what is called a cantilever structure, the pressure sensor is hardly affected by thermal distortions of the electrodes and it thus has excellent temperature characteristics. Further, even if the sensor body is distorted by clamping the fitting flanges, variations in the distances between the moving electrode and the fixed electrodes by the distortion are small since the electrodes are of the cantilever structure and since their fixed portions are close to each other. Moreover, the sensor body is formed as a unitary structure, and hence has a low manufacturing cost compared with a conventional pressure sensor of the same general type having a body divided into two parts.

The converter circuit of the present invention is stable with respect to ambient temperature changes and hence is capable of stably amplifying and outputting an electric signal corresponding to a mechanical displacement. Further, since the converter circuit does not incorporate first and second impedance elements in a bridge circuit using rectifier elements, which arrangement is unlike the prior art circuit, no process for matching characteristics of circuit components is necessary. In addition, the circuit arrangement of the converter circuit is simplified and consequently its reliability is enhanced.

While in the foregoing discussion the capacitance type pressure sensor of the present invention has been described as a differential pressure type in which pressure receiving diaphragms are provided on both sides of the sensor, the present invention is equally applicable to a pressure transmitter in which a pressure receiving diaphragm is provided only on one side of the sensor. Moreover, in the specific example of the capacitance type pressure sensor, the electrodes are shown to be insulated from the sensor body. However, the present invention can be practiced by an electric circuit in which the moving electrode and the sensor body are not insulated from each other.

What is claimed is:

1. A pressure transducer comprising: a capacitance type pressure sensor having a sensing chamber provided at the center of a member forming a pressure sensor body, said sensing chamber being filled with sealed liquid; a moving electrode of a cantilever structure disposed in said sensing chamber, a through hole extending from said sensing chamber to at least one side of said pressure sensor body; a pressure receiving element on at least one side of said pressure body; a rod coupling said pressure receiving element and said moving electrode through said through hole; and two fixed electrodes of a cantilever structure disposed opposite said moving electrode in said sensing chamber to form first and second variable capacitance elements together with said moving electrode, wherein an electric signal corresponding to a pressure is produced in accordance with variations in the capacitances of said first and second variable capacitance elements.

2. A pressure transducer comprising: a capacitor type pressure sensor having a sensing chamber provided at the center of a member forming a pressure sensor body, said sensing chamber being filled with a sealed liquid; a moving electrode of a cantilever structure disposed in said sensing chamber, a through hole extending from said sensing chamber to at least one side of said pressure sensor body; a pressure receiving element on at least one side of said pressure sensor body; a rod coupling said pressure receiving element and said moving electrode through said through hole; and two fixed electrodes of a cantilever structure disposed opposite said moving electrode in said sensing chamber to form first and second variable capacitance elements together with the moving electrode; and a converter circuit comprising a change-over switch for selecting one of said first and second variable capacitance elements; a variable frequency type oscillator for generating first and second frequency signals of frequencies corresponding respectively to the impedance of said first and second variable capacitance elements, said variable capacitance elements being connected via said change-over switch to said oscillator; and an arithmetic unit for obtaining a signal corresponding to the ratio between the difference and sum of said first and second frequency signals.

3. A pressure transducer of claim 2 wherein said change-over switch of said converter circuit comprises first and second complementary MOSFET switches having first and second input coupled, respectively, to said fixed electrodes.

4. A pressure transducer comprising: a capacitance type pressure sensor having a sensing chamber provided at the center of a member forming a pressure sensor body, said sensing chamber being filled with a sealed liquid; a moving electrode of a cantilever structure disposed in said sensing chamber, a through hole extending from said sensing chamber to at least one side of said pressure sensor body; a pressure receiving element on at least one side of said pressure sensor body; a rod coupling said pressure receiving element and said moving electrode through said through hole; two fixed electrodes of a cantilever structure disposed opposite said moving electrode in said sensing chamber to form first and second variable capacitance elements together with said moving electrode; and a converter circuit comprising a change-over switch for selecting one of said first and second variable capacitance elements; a variable frequency type oscillator for generating first and second frequency signals of frequencies corresponding respectively to the impedances of said first and second variable capacitance elements, said variable capacitance elements being connected via said change-over switch to said oscillator; and an arithmetic unit including a counter which, upon counting a predetermined number of cycles of one of said first and second frequency signals from the oscillator, inverts its output to change over said change-over switch, and circuit means for obtaining from a duty cycle signal from said counter a signal corresponding to the ratio between the difference and sum of said first and second frequency signal.

5. The pressure transducer of claim 4 wherein said variable frequency type oscillator comprises a first complementary MOSFET inverting amplifier including third and fourth complementary MOSFET transistors and a second complementary MOSFET inverting amplifier including fifth and sixth complementary MOSFET transistors, a first output terminal of said change-over switch being coupled to sources and drains of said fifth and sixth transistors and a second output terminal of said change-over switch being coupled to first gates of said third and fourth transistors and coupled via a resistor to sources and drains of said third and fourth transistors and to first gates of said fifth and sixth transistors, sources and second gates of said third and fifth transistors being coupled to a positive power source and drains and second gates of said fourth and sixth transistors being coupled to a negative power source, a connection point between said fifth and sixth transistors being coupled to an output terminal of said oscillator.

6. The pressure transducer of claim 5 wherein said arithmetic unit comprises counter means having a clock input coupled to said output terminal of said oscillator and a most significant bit output coupled to gates of said first and second transistors of said change-over switch; eighth and ninth complementary MOSFET transistors having first gates coupled to said most significant output of said counter, a source and a second gate of said eighth transistor being coupled to a positive power source and a drain and second gate of said ninth transistor being coupled to a negative power source, drains and sources of said eighth and ninth transistors being coupled to a connection point; and a smoothing circuit having an input coupled to said connection point, said smoothing circuit comprising first and second resistors coupled in series with a first terminal of said first resistor being coupled to said connection point, and first and second capacitors coupled in series with one another and coupled across said second resistor with a first terminal of said first capacitor coupled to a junction between said first and second resistors, first and second terminals of said second capacitor being coupled to output terminals of said arithmetic unit.

7. The pressure transducer of claim 6 further comprising an output unit coupled to said output terminals of said arithmetic unit, said output unit comprising a two-wire signal transmitter for outputting a current signal in response to signals on said output terminals of said arithmetic unit, said signal transmitter comprising an operational amplifier having a non-inverting input terminal coupled to a first output terminal of said arithmetic unit; a zener diode for determining the magnitude of positive and negative power source voltages, an anode of said zener diode being coupled to said negative power source and cathode of said zener diode being coupled to said positive power source, a second output of said arithmetic unit formed at the junction of said first and second capacitors being coupled to said negative power source; a voltage divider coupled between said anode and said cathode of said zener diode for applying a voltage of a predetermined magnitude to an inverting input of said operational amplifier; an output transistor having an input coupled to an output of said operational amplifier; and a transistor coupled in a constant current configuration for supplying current to said zener diode.

8. A pressure transducer comprising: a capacitance type pressure sensor having a sensing chamber provided at the center of a member forming a pressure sensor body, said sensing chamber being filled with a sealed liquid; a moving electrode of a cantilever structure disposed in said sensing chamber, a through hole extending from said sensing chamber to at least one side of said pressure sensor body; a pressure receiving element on at least one side of said pressure sensor body; a rod coupling said pressure receiving element and said moving electrode through said through hole; two fixed electrodes of a cantilever structure disposed opposite said moving electrode in said sensing chamber to form first and second variable capacitance elements together with said moving electrode; and a sealing cap sealing said sealed liquid in said sensing chamber, said sealing cap being at least partially filled with glass to hold said moving electrode and said fixed electrodes while electrically insulating them, wherein an electric signal corresponding to a pressure is derived from variations in the capacitances of said first and second variable capacitance elements.

* * * * *